UNITED STATES PATENT OFFICE.

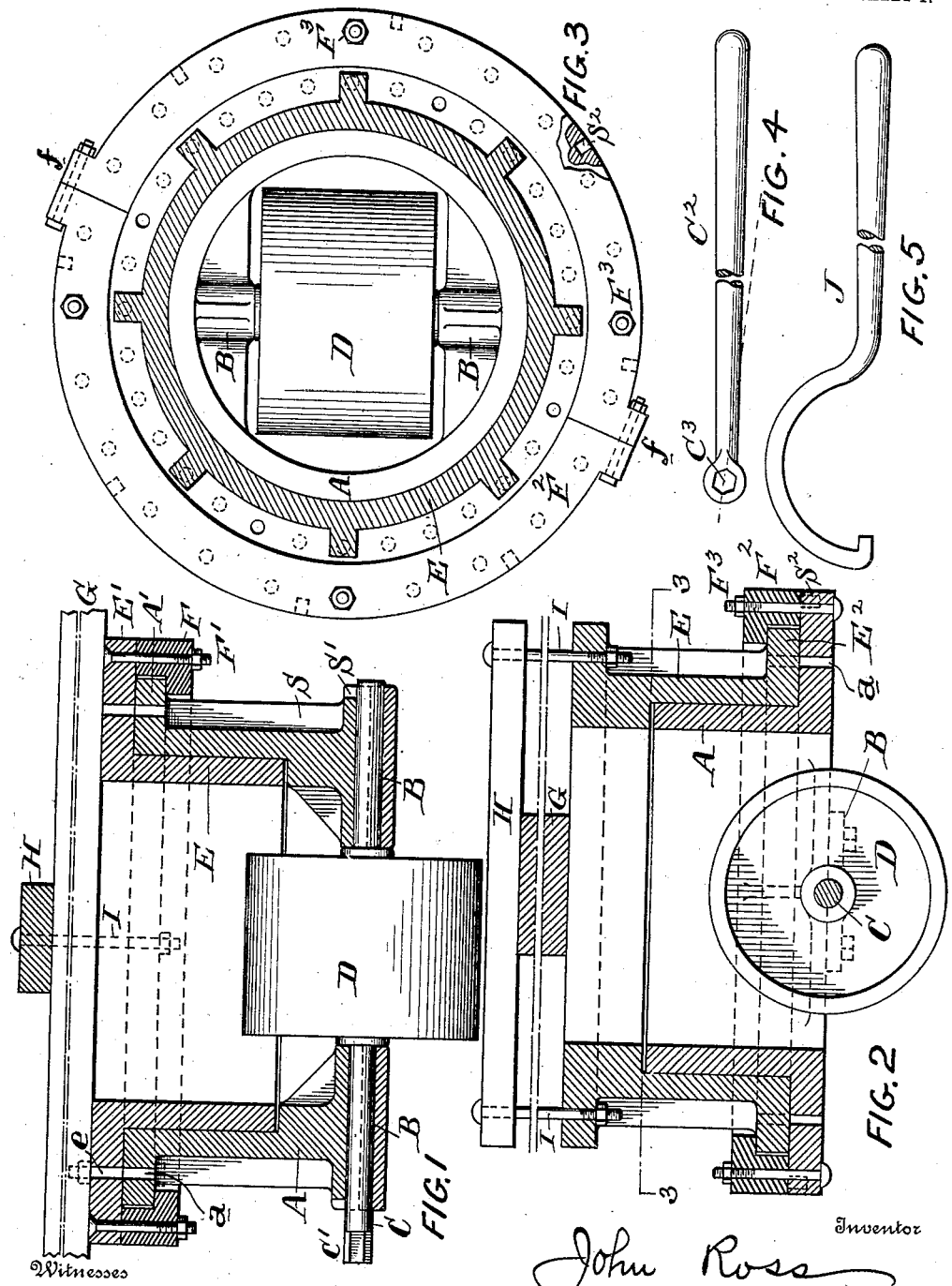

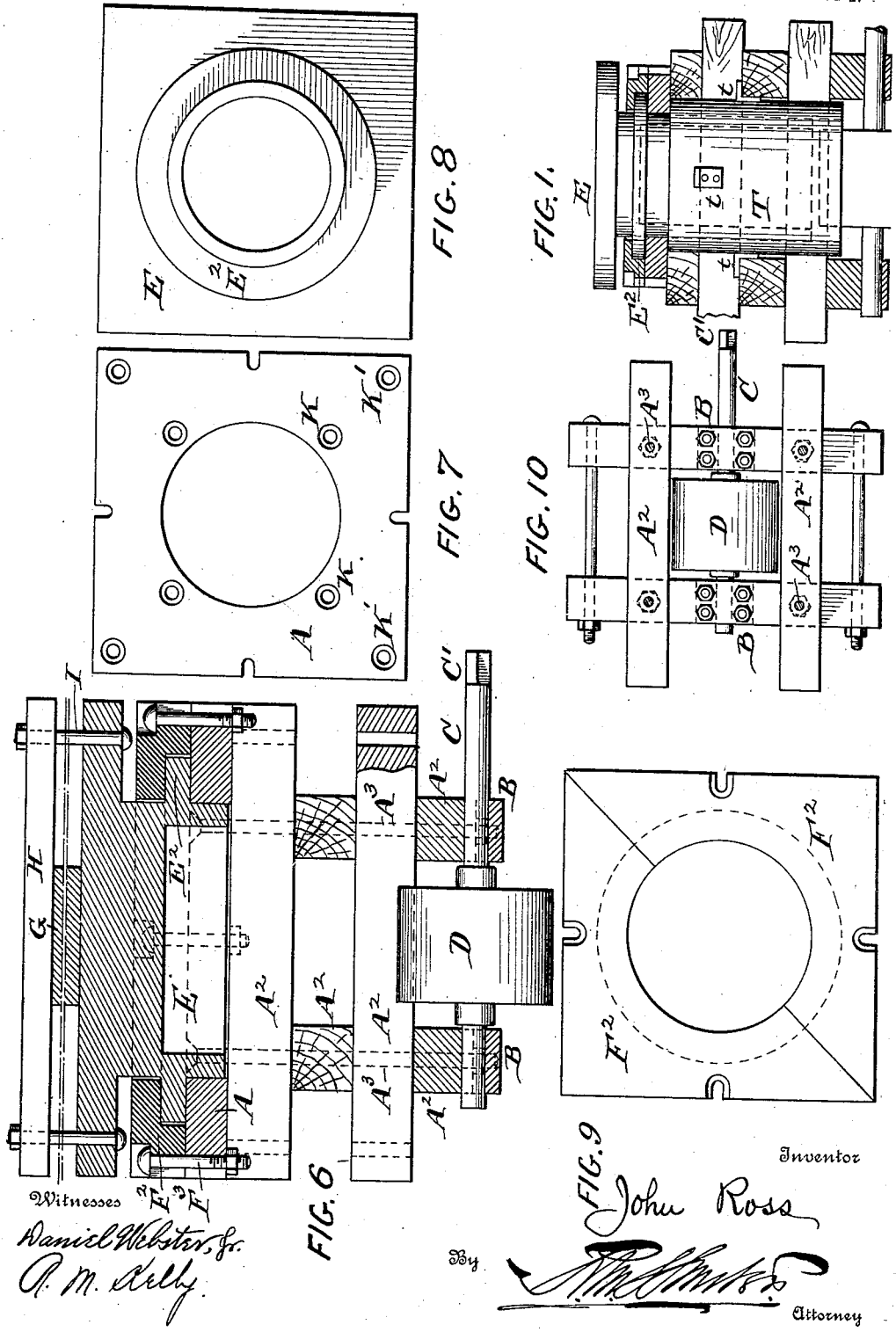

JOHN ROSS, OF PHILADELPHIA, PENNSYLVANIA.

RIGGER'S TRUCK.

No. 910,727.  Specification of Letters Patent.  Patented Jan. 26, 1909.

Application filed April 11, 1908. Serial No. 426,483.

*To all whom it may concern:*

Be it known that I, JOHN ROSS, a citizen of the United States, and a resident of the city and county of Philadelphia, State of Pennsylvania, have invented an Improvement in Riggers' Trucks, of which the following is a specification.

My invention has reference to riggers' trucks, and consists of certain improvements, which are fully set forth in the following specification, and shown in the accompanying drawings, which form a part thereof.

The object of my invention is to provide a construction of truck which shall be exceedingly strong and easily handled, whereby all possible adjustments under the load may be performed without endangering in any way the stability of the truck.

My invention consists of a truck made of two main parts, one of which carries the load, and the other of which is provided with the roller, and said parts being sleeved together so as to permit rotation of either upon the other about a vertical axis, and combined with means for maintaining engagement of the two parts while permitting of their rotation, whereby inequalities in the road will not permit the part carrying the roller to become disengaged from the part attached to the building or other load.

My invention also consists in providing means for locking the two parts which are sleeved together in definite relative adjustments, so that they may be prevented from having a relative rotation about a vertical axis, which locked condition would be especially employed where the load was to be conveyed in a straight line for a considerable distance.

My invention also comprehends details of construction which, together with the features above specified, will be better understood by reference to the drawings, in which:

Figure 1 is a sectional elevation through a rigger's truck embodying my invention; Fig. 2 is a similar view of the same, slightly modified, but with the section taken at right angles so as to show a side view of the wheel and a cross section of the axle; Fig. 3 is a sectional plan view of Fig. 2 on line 3—3; Fig. 4 is the wrench lever for turning the roller and its shaft; Fig. 5 is a wrench for adjusting the lower part of the truck about the vertical axis to change its direction of travel; Fig. 6 is a sectional elevation of a modification of my improved truck; Figs. 7, 8, and 9 are plan views of portions of the truck shown in Fig. 6; Fig. 10 is a sectional plan view of the lower part of the truck shown in Fig. 6; and Fig. 11 is a modification of the truck shown in Fig. 6.

Referring to Fig. 1, E is the upper tubular part of the truck, and may have the flange E' at the top. A is the lower tubular part of the truck, and is sleeved upon the upper part E, and is provided with bearings B B for the shaft C, to which the roller D is secured and which extends upwardly within the tubular openings of the parts A and E. The end of the shaft C is made hexagonal or other polygonal shape, as at C' to receive a wrench lever by which it may be turned. The upper portion of the tubular part A is provided with an outwardly directed flange A', which may rest against the under surface of the flange E' of the tubular part E. F is a retaining ring which is bolted to the under side of the flange E' by means of bolts F', and has an inwardly directed annular flange which extends beneath the flange A' of the lower part A. It will be seen from this construction that while the parts A and E may be relatively adjusted about a vertical axis, the part A cannot fall away from the part E, or in any way become disengaged from operative position through the use of the truck under a load and when traveling over a very irregular surface or roadway. Ordinarily, there would be a large number of these trucks under the load especially if it were a building, and the common practice would be to employ a long sill G resting upon the upper part of a series of trucks and clamped thereon by means of cross bars H and bolts I. The load may rest upon the sill. In case of moving a load, there would be two or more such sills and a series of trucks under each sill. If the trucks are secured to the sills, it is evident that should the roller of any truck come over a hollow place in the road, it would be prevented from dropping down and disengaging the lower part A from the upper tubular part E, because of the presence of the retaining ring F. The rotation of the roller D is accomplished by any suitable lever device attached to the polygonal shaped end C'. As shown in Fig. 1, this end is made hexagonal, and a lever wrench such as shown in Fig. 4 may be employed in connection therewith. More specifically, this lever wrench consists of a long handle C² provided with a socket C³ shaped to fit over the polygonal end C'. In the particular construction shown, the end C' is hexagonal, as is also the socket C³. The position of the socket C³ is arranged so that a line through opposite angular portions will be slightly out of alinement with the handle C² as indicated in the dotted line. In this way, the lever will obtain better capacity for adjustment as it may be placed on the end of the shaft C from either side of the wrench. This would give capacity for applying the wrench under some difficult conditions where otherwise it might not be applied and moved.

To adjust the lower part A of the truck about the vertical axis, a wrench of the character shown at J in Fig. 5 may be employed, and may be made to engage either the ribs S about the part A or notches S' about the base of the said part, and by means of leverage action cause the said base part A to be turned about its vertical axis.

The upper flange A' of the base part may be provided with a series of holes $a$, and these may be brought into alinement with two or more holes $e$ in the flange E' of the upper part E of the truck. Bolts indicated in dotted lines may pass through these holes when in alinement for uniting the parts A and B, whereby they will not be permitted to have relative rotary adjustment. These would only be employed when the trucks were required to move in a straight line for long distances. Instead of employing the bolts as above stated, the retaining ring F may be made to clamp the flange A' by frictional contact therewith to hold the parts A and B against relative rotation. Any other suitable means may be employed for this purpose also, if so desired.

Instead of arranging the retaining device F upon the upper part E and adapted to hold the lower part A in position, it may be secured to the lower part and made to engage the flange upon the upper part as more fully indicated in Figs. 2 and 3. In this case, the retaining ring is shown at F², and is clamped to the lower flange of the lower part A of the truck by means of bolts F³. The upper part E of the truck is provided with a lower flange E² which extends under the retaining ring F². In general construction, the arrangement shown in Fig. 2 is the same as that shown in Fig. 1 inverted and with the roller D applied to the bottom part. Otherwise the structures are identical.

To enable the retaining rings F or F² to be applied, they may be made in two parts bolted together as at $f$, indicated in Fig. 3. In Figs. 2 and 3, the lower flange of the lower part A of the truck may be provided with holes or notches about its periphery, as indicated at S², for engagement with the wrench J when adjusting the lower part of the truck about the vertical axis.

The construction shown in Figs. 6 to 10, inclusive, is substantially the same as that shown in Figs. 1, 2 and 3, differing, however, in structural details to adapt it for special purposes where there is to be a considerable height between the base and top of the truck, this construction enabling that height to be varied to suit the requirements of any particular use of the truck. Referring to these figures, E is the upper part of the truck which carries the sill G as before, and it is provided with a similar flange E². A is the lower part, and is sleeved about the upper part E and rests against the flange E². It is provided with the retaining ring F² which is bolted in place over the flange E² by bolts F³, as in Fig. 2. Instead of directly connecting the roller to the lower part A of the truck, there are arranged a series of pairs of cross bars A² which are secured together by vertical bolts A³ and to the lowermost cross bars A², the roller D is journaled by its shaft C and bearings B. The end of the shaft C in this case is shown as made square and would require a wrench having a socket of that character. These cross bars A² may have holes for the bolts A³ at different distances apart, so as to widen the base of support whenever necessary to impart more stability to the structure. The lower part A is shown in Fig. 7, and is provided with an inner set of holes K and an outer set of holes K'. In Fig. 6, the bolts A³ are shown as passing through the holes K to clamp the cross bars A² to the lower part A of the truck. If desired, these bolts may pass through the holes K' and through the outer holes in the cross bars.

In Fig. 11, is shown a slight modification of the structure illustrated in Fig. 6, the difference being that the lower portion of the upper part E is extended outward in cylindrical form and a tubular part T is arranged about it and supported by lugs $t$ upon the cross bars A², so as to give more stability to the truck as a whole. As the cross bars A² are bolted to the part, it follows that the said parts are also in effect secured to the tubular part T; and these parts together make up, with the roller, the lower part of the truck proper.

These constructions shown in Figs. 6 to 11 would only be used where considerable height was required of the truck, and moreover particularly in those cases where that height was required to be varied to suit different operations.

While I have shown my improvements in the form which I consider most adapted for commercial practice, I do not limit myself to the details, as these may be modified, without departing from the spirit of the invention.

Having now described my invention, what I claim as new, and desire to secure by Letters Patent, is:—

1. In a rigger's truck, upper and lower frames having tubular parts engaging each other to form a sleeved joint and by which the lower part is centralized upon the upper part, combined with a roller support for the lower part, means for preventing the disengagement of the lower part from the upper part while permitting rotation thereon, and a shaft carrying the roller and journaled in the lower part and having one end extended beyond the frames for rotating the roller.

2. In a rigger's truck, upper and lower frames having tubular parts engaging each other to form a sleeved joint and by which the lower part is centralized upon the upper part, combined with a roller support for the lower part, means for preventing the disengagement of the lower part from the upper part while permitting rotation thereon, means for detachably connecting the upper and lower parts together to prevent relative rotation when the truck is to be used for straight travel, and a shaft carrying the roller and journaled in the lower part and having one end extended beyond the frames for rotating the roller.

3. In a rigger's truck, upper and lower frames having cylindrical parts engaging each other to form a sleeved joint and by which the lower part is centralized upon the upper part combined with a roller support for the lower part, a shaft carrying the roller and journaled in the lower part and having one end extended beyond the frames for rotating the roller, and adjustable parts interposed between the roller shaft and the above specified lower part whereby the truck as a whole may be made of various heights to suit the work to be done.

4. In a rigger's truck, upper and lower frames having tubular parts engaging each other to form a sleeved joint and by which the lower part is centralized upon the upper part by a direct engagement, combined with a roller support for the lower part, means consisting of a ring secured to one of the parts and a flange on the other part overlapping the ring for preventing the disengagement of the lower part from the upper part while permitting rotation thereon, and a shaft carrying the supporting roller and journaled in the lower part and having one end extended beyond the frames for rotating the roller.

5. In a rigger's truck, upper and lower frames having tubular parts engaging each other to form a sleeved joint and by which the lower part is centralized upon the upper part, combined with a roller support for the lower part, means consisting of a detachable ring made in two parts bolted together secured to one of the parts and a flange on the other part overlapping the ring for preventing the disengagement of the lower part from the upper part while permitting rotation thereon, and a shaft carrying the roller and journaled in the lower part and having one end extended beyond the frames for rotating the roller.

6. In a rigger's truck, upper and lower frames having tubular parts engaging each other to form a sleeved joint and by which the lower part is centralized upon the upper part, combined with a roller support for the lower part whereby the two frames may be radially adjusted relatively to each other without changing their vertical positions, means for locking the frames in their relative adjusted positions, means secured to one of the parts for preventing disengagement of the other part in the direction of the axis of rotation, and a shaft carrying the roller and journaled in the lower part and having one end extended beyond the frames for rotating the roller.

7. In a rigger's truck, upper and lower frames having tubular parts engaging each other to form a sleeved joint and by which the lower part is centralized upon the upper part, combined with a roller support for the lower part whereby the two frames may be radially adjusted relatively to each other without changing their vertical positions, means for locking the frames in their relative adjusted positions, a shaft carrying the roller and journaled in the lower part and having one end extended beyond the frames for rotating the roller, and clamping devices secured to the upper part for clamping the truck to the load to be moved without interfering with the relative rotary adjustment of the lower part upon the upper part.

8. In a rigger's truck, the combination of an upper flanged tubular frame, a lower flanged tubular frame having its tubular part sleeved with the tubular part of the upper frame, a supporting roller device, means to hold the two frames from being detached in the direction of their axis of relative rotation, a shaft for the roller device journaled on the bottom part of the lower frame, and means for adjustably clamping the flanged part of the lower frame to the upper frame.

9. In a rigger's truck, upper and lower frames having tubular parts engaging each other to form a sleeved joint and by which the lower part is centralized upon the upper part, combined with a roller support for the lower part whereby the two frames may be radially adjusted relatively to each other without changing their vertical positions, means for locking the frames in their relative adjusted positions, a shaft carrying the roller and journaled in the lower part and having one end extended beyond the frames for rotating the roller, and clamping devices secured to the upper part consisting of clamping bar H and clamping bolts I I for clamping the truck to the load to be moved without interfering with the relative rotary adjustment of the lower part upon the upper part.

10. In a rigger's truck, an upper frame having a downwardly extending tubular part, and a lower flanged frame extending upward outside of the upper frame and made hollow in the center, combined with means for holding the two frames against disengagement, a roller extending partly upward into and shielded by the lower frame, and an axle for the roller journaled to the lower frame and extending laterally therefrom.

11. In a rigger's truck, an upper frame having a downwardly extending tubular part, combined with a lower frame sleeved upon the tubular part of the upper frame and circumferentially adjustable thereon, means to prevent disengagement of the lower frame with respect to the upper frame, a rolling support having a shaft journaled upon the lower part of the lower frame.

12. In a rigger's truck, an upper and a lower part sleeved together to have relative adjustment about a vertical axis, a roller journaled in the lower frame, and clamping means carried by the upper frame for clamping the truck to the load to be moved.

13. In a rigger's truck, an upper and a lower part sleeved together to have relative adjustment about a vertical axis, a roller journaled in the lower frame, and clamping means consisting of a transverse clamping bar and clamping bolts carried by the upper frame for clamping the truck to the load to be moved.

14. In a rigger's truck, a main body combined with a supporting roller, and a shaft secured to the roller and journaled in bearings on the main body and also having its end extended beyond the body and journal bearing and made polygonal in cross section.

15. In a rigger's truck, a main body combined with a supporting roller, a shaft secured to the roller and journaled in bearings on the main body and also having its end extended beyond the body and journal bearing and made polygonal in cross section, and a detachable lever for intermittently rotating the shaft provided with a polygonal socket to fit the polygonal end of the shaft.

In testimony of which invention, I have hereunto set my hand.

JOHN ROSS.

Witnesses:
R. M. HUNTER,
R. M. KELLY.